UNITED STATES PATENT OFFICE 2,445,740

AQUEOUS RUBBER DISPERSIONS

Arnold R. Davis, Riverside, Conn., assignor to American Cyanamid Company, New York, N. Y., a corporation of Maine No Drawing. Application November 8, 1945, Serial No. 627,541

5 Claims. (Cl. 260—760)

This invention relates to aqueous dispersions of rubber (latex), and more particularly to latices having improved wetting and penetrating properties for cloth, cords such as tire cords, and other materials to be coated or impregnated therewith. Principal objects of the invention are to provide improved latices of this type for use in the textile, rubber and latex industries containing wetting or surface-active agents of the type hereinafter described which will not only improve the wetting properties of the latex to a high degree, but which are stable in relatively strongly alkaline solutions, such as alkaline solutions having pH values from about 8 to about 11.

The textile and rubber industries have long been interested in the development of improved methods of impregnating various materials with latex. Since natural and synthetic latices do not readily wet textiles, paper, and the like it has previously been proposed to employ various types of commercially available wetting agents to improve the speed of wetting. However many of the most active wetting agents that have previously been used for this purpose are not completely stable to alkalies, and therefore their effective life in alkaline rubber dispersions is limited. Alkali-stable wetting agents such as alkylated aryl sulfonic acids, on the other hand, are in general not highly active in latex, and in many cases will not impart the degree of wetting power that is desired for rapid coating and impregnating of textiles.

My present invention is based on the discovery that a mixture of two particular types of alkali-stable wetting agents will impart better wetting and penetrating properties to latices than can be obtained with the same quantity of either wetting agent when used alone. When these two wetting agents are used together in rubber dispersions an improvement in the wetting properties of the emulsion is obtained which is comparable to that imparted by the highly active, non-alkali-stable wetting agents referred to above.

The two wetting agents which are used together in preparing the improved compositions of my invention are alkylated naphthalene sulfonic acids, specifically propylated naphthalene sulfonic acids, in the form of their alkali metal or other water-soluble salts, together with alkyl sulfosuccinamates. The propylated naphthalene sulfonates are well-known alkali-resistant wetting agents and have previously been suggested for use in rubber dispersions; however, they are not sufficiently powerful when used alone to obtain the degree of wetting desired for use in rapid latex coating and impregnating operations. The alkyl sulfosuccinamates, which are also preferably employed in the form of their alkali metal salts, are also alkali-stable. Mixtures of these two materials, when incorporated into latices in quantities on the order of 0.25–1% based on the weight of the rubber dispersion, will so increase the wetting and impregnating properties of the emulsion that it can be applied to tire cords, textiles, paper and similar materials at a high rate of speed to obtain a uniform impregnating and coating thereof. If it is desired to vulcanize the rubber deposit or film, dispersions of vulcanizing agents such as sulfur, etc., may be added to the latex as required.

The preferred monoamides of aliphatic sulfopolycarboxylic acids which are employed in the present invention have the general formula

in which $R_1$ is a member of the group consisting of hydrogen, aliphatic, alkoxyalkyl, etc. radicals, $R_2$ is a member of the group consisting of aliphatic and alkoxyalkyl radicals, and X is a salt-forming radical such as sodium or other alkali metal, ammonium and the like. Typical compounds of this class which may be used are N-monooctyl disodium sulfosuccinamate, N-monodecyl dipotassium sulfosuccinamate, N-tetradecyl diammonium sulfosuccinamate, N-octadecyl disodium sulfosuccinamate, N-dodecoxydecyl disodium sulfosuccinamate, N-tetradecoxypropyl disodium sulfosuccinamate, N-di-2-ethylhexyl disodium sulfosuccinamate, N-di-2-ethylhexoxypropyl disodium sulfosuccinamate, N-di-2-undecoxypropyl disodium sulfosuccinamate and N-didodecyl disodium sulfosuccinamate. These and similar compounds are prepared by reacting the corresponding primary or secondary amines with maleic anhydride or with fumaric acid and sulfonating the resulting monoamide with sodium sulfite, as described in U. S. Patent No. 2,252,401.

While in general any alkali metal salt of an alkylated naphthalene sulfonic acid may be used in practicing the method of the invention, I prefer to employ propylated naphthalene sodium sulfonates. One method of preparing these compounds is described in detail in German Patent No. 336,558, according to which isopropyl alcohol is condensed with naphthalene sulfonic acid in the presence of sulfuric acid to incorporate about 2.5 propyl groups per mol of naphthalene sulfonic acid. It should be understood, however, that alkylated and particularly propylated naphthalene sulfonic acids prepared by other methods and, if desired, having a higher degree of alkylation may be used in preparing the compositions of the invention.

When dialkyl disodium sulfosuccinamates are used, in suitable proportions, together with isopropyl naphthalene sodium sulfonates the mixtures impart to latex greatly increased wetting powers, particularly as concerns the wetting of various textile materials. The amounts of the two components may be varied, e. g. the dialkyl disodium sulfosuccinamate may constitute from about 25% to about 75% of the mixture, and the alkylated naphthalene sodium sulfonate may constitute the remaining 75% to 25%. The components of the wetting agent mixture may be incorporated into the latex in any suitable manner, i. e. they may be added thereto separately or together.

In measuring the relative wetting powers of various wetting agents it is common practice to employ the Draves sinking test, which measures the length of time necessary for a weighted skein of yarn to sink in an aqueous solution of the wetting agent. When employing latex, however, the opacity of the dispersion is such as to require a slight modification of this standard test. The method I have employed to measure the relative wetting properties of my mixture and existing commercial products comprises carefully laying on the surface of the wetting agent-containing latex a 1-inch strip of cotton tire cord. The time elapsing until the tire cord sinks beneath the surface of the mixture provides a suitable measure of the relative wetting powers of the various agents.

The following detailed examples, while indicative of the procedure employed, are given for illustrative purposes only and do not constitute limitations of the invention.

*Example 1*

An aqueous dispersion of rubber containing 19.5% solids and having a pH of about 11 was employed. In each test, the amount of wetting agent employed was based, by weight, on the latex.

|  | A | B | C | D |
|---|---|---|---|---|
| Sodium isopropyl naphthalene sulfonate | Percent 0.4 | Percent 0.1 | Percent 0.3 | Percent |
| N-bis-octoxypropyl disodium sulfosuccinamate |  | 0.3 | 0.1 | 0.4 |
| Sinking time in seconds for 1-inch cotton tire cord ||||
| 386 | 13.1 | 90.6 | 22 |

*Example 2*

A rubber dispersion (latex) as in Example 1 was employed; likewise, the amounts of wetting agent were similarly determined.

|  | E | F | G | H |
|---|---|---|---|---|
| Sodium isopropyl naphthalene sulfonate | Percent 1 | Percent 0.25 | Percent 0.75 | Percent |
| N-di(n)-octyl disodium sulfosuccinamate |  | 0.75 | 0.25 | 1 |
| Sinking time in seconds for 1-inch cotton tire cord ||||
| 30.2 | 6.2 | 4.5 | 25.2 |

It is readily apparent from the above examples that the present invention provides a wetting agent mixture which imparts to the latex very desirable wetting properties without necessitating any increase in the total amount of wetting agent employed. It is also clearly demonstrated that my mixture of two separate wetting agents provides a material which imparts to latex greater wetting power than does either of the component wetting agents when employed singly. It has also been shown that the relative amounts of components which may suitably be employed may be varied widely as shown by the examples.

The above detailed description is intended to be illustrative only, and modifications thereof may be resorted to within the scope of the appended claims.

What I claim is:

1. An aqueous rubber composition having dissolved therein a small amount of a water-soluble salt of a propylated naphthalene sulfonic acid together with a sulfosuccinamate of the formula

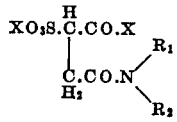

in which $R_1$ is a member of the group consisting of hydrogen and aliphatic and alkoxyalkyl radicals and $R_2$ is a member of the group consisting of alkyl and alkoxyalkyl radicals and X is a salt-forming radical, the sum of the carbon atoms in $R_1$ and $R_2$ being from 8 to 24 inclusive.

2. An aqueous rubber composition having dissolved therein a small amount of a mixture of alkali-stable wetting agents, said mixture containing about 75–25% of a water-soluble salt of a propylated naphthalene sulfonic acid and about 25–75% of a sulfosuccinamate of the formula

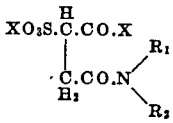

in which $R_1$ is a member of the group consisting of hydrogen and aliphatic and alkoxyalkyl radicals and $R_2$ is a member of the group consisting of alkyl and alkoxyalkyl radicals and X is a salt-forming radical, the sum of the carbon atoms in $R_1$ and $R_2$ being from 8 to 24 inclusive.

3. An aqueous rubber composition having dissolved therein a small amount of a water-soluble salt of a propylated naphthalene sulfonic acid together with a water-soluble salt of N-bis-octoxypropyl sulfosuccinamate.

4. An aqueous rubber composition having dissolved therein a small amount of a water-soluble salt of a propylated naphthalene sulfonic acid together with a water-soluble salt of N-dioctyl sulfosuccinamate.

5. An aqueous rubber composition having dissolved therein about 0.25% to 1% of a mixture of alkali-stable wetting agents, said mixture containing about 75–25% of a water-soluble salt of a propylated naphthalene sulfonic acid and about 25–75% of a sulfosuccinamate of the formula

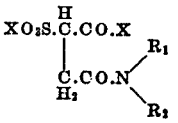

in which $R_1$ is a member of the group consisting of hydrogen and aliphatic and alkoxyalkyl radicals and $R_2$ is a member of the group consisting of alkyl and alkoxyalkyl radicals and $X$ is a salt-forming radical, the sum of the carbon atoms in $R_1$ and $R_2$ being from 8 to 24 inclusive.

ARNOLD R. DAVIS.

REFERENCES CITED

The following references are of record in the file of this patent:

UNITED STATES PATENTS

| Number | Name | Date |
|---|---|---|
| 1,838,826 | Hopff et al. | Dec. 29, 1931 |
| 2,252,401 | Jaeger | Aug. 12, 1941 |
| 2,321,111 | Stamberger | June 8, 1943 |

OTHER REFERENCES

"India Rubber World" of Sept. 1936, pages 50–53.